United States Patent [19]

Hopkins et al.

[11] Patent Number: 5,319,692
[45] Date of Patent: Jun. 7, 1994

[54] NUCLEAR REACTOR REFLECTOR

[75] Inventors: Ronald J. Hopkins; John T. Land; Michael C. Misvel, all of Pensacola, Fla.

[73] Assignee: Westinghouse Electric Corp., Pittsburgh, Pa.

[21] Appl. No.: 903,634

[22] Filed: Jun. 24, 1992

[51] Int. Cl.$^5$ ............................................. G21C 11/06
[52] U.S. Cl. .................................... 376/458; 376/302; 376/400; 376/459
[58] Field of Search ............... 376/458, 459, 302, 303, 376/304, 400

[56] References Cited

U.S. PATENT DOCUMENTS

| | | | |
|---|---|---|---|
| 4,146,430 | 3/1979 | Berringer | 376/302 |
| 4,701,299 | 10/1987 | Alibran et al. | 376/302 |
| 4,751,043 | 6/1988 | Freeman et al. | 376/458 |
| 4,849,162 | 7/1989 | Garner et al. | 376/458 |
| 4,925,624 | 5/1990 | Chevereau et al. | 376/459 |

FOREIGN PATENT DOCUMENTS

| | | |
|---|---|---|
| 0323306 | 7/1989 | European Pat. Off. . |
| 0367963 | 5/1990 | European Pat. Off. . |
| 0488890 | 6/1992 | European Pat. Off. . |

Primary Examiner—Daniel D. Wasil

[57] ABSTRACT

A nuclear reactor reflector is disclosed that comprises a stack of reflector blocks with vertical water flow passages to cool the reflector. The interface between blocks is opposite support points for reactor fuel rods. Water flows between the reflector and the reactor barrel from passages in a bottom block. The top block contains a flange to limit this flow and the flange has a slot to receive an alignment pin that is welded to the barrel. The pin is held in the slot by two removable shims. Alignment bars extend the length of the stack in slots machined in each block when the stack is assembled.

9 Claims, 9 Drawing Sheets

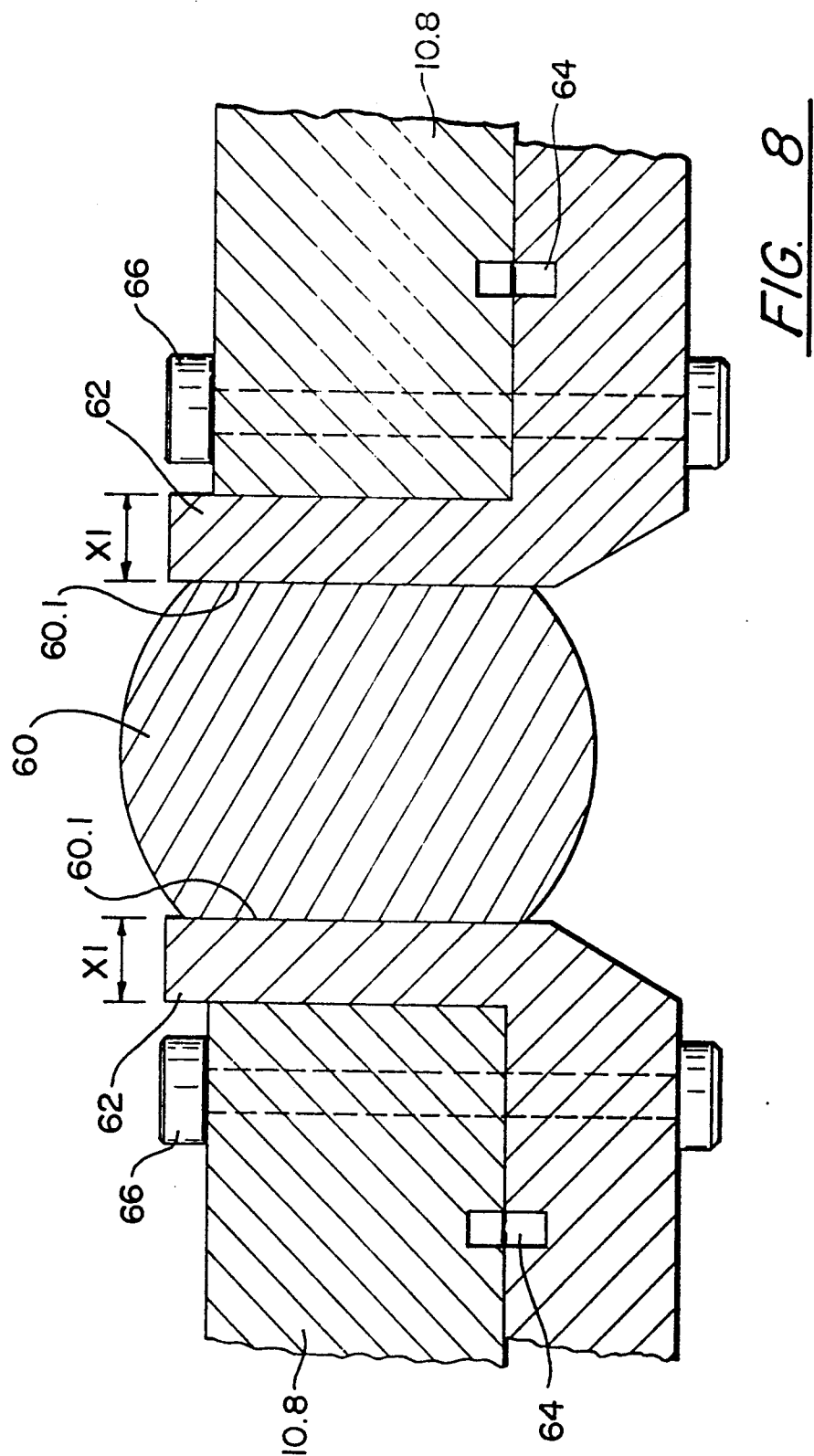

NUCLEAR REACTOR REFLECTOR

GOVERNMENT CONTRACT

The Government of the United States of the America has rights in this invention pursuant to Contract No. DE-AC03-90SF18495 awarded by the Department of Energy.

TECHNICAL FIELD

This invention relates to nuclear reactors, in particular, nuclear reactor reflectors.

BACKGROUND OF THE INVENTION

In a typical nuclear reactor, the reactor fuel core, comprising rods mounted in modular elongated fuel assemblies located in a cylindrical core barrel that is inside a pressure vessel. In a steam generation system using one of these reactors, water is supplied to the pressure vessel, flows down an annular space between the core barrel and the pressure vessel, reverses direction, and flows upward through openings in the lower core support leading to the reactor core. Filling the space between the reactor core and the barrel, a neutron reflector is supplied with some of this water to cool it. U.S. Pat. No. 4,849,162 shows a reflector design, where a plurality of vertically standing rods extend the length of the core tightly packed together, the space between the rods, providing a uniform water passage through the reflector. The diameter of the rods are selected to provide a specific area passage in order to achieve a specific heat transfer. U.S. Pat. No. 4,701,299 discusses a modular lining around the core, and there a lining consists of assemblies of prismatic shape arranged side by side inside the barrel. The resultant liner consists of modular metal elements "juxtaposed" so that the modular lining occupies virtually all the volume of the annulus around the core.

Each of these techniques relies on a heavy, costly and complex reflector having a considerable number of parts, especially fasteners holding the reflector in the barrel.

DISCLOSURE OF THE INVENTION

Among the objects of the present invention is to provide an uncomplicated, lightweight, reliable reactor reflector.

According to the invention, a deflector as constructed of generally circular reflector blocks with an interior annulus having orthogonal walls that conform to the plan profile of the reactor core. The blocks, in effect doughnuts, are stacked one on top of the other, forming a reflector stack. The reflector stack rests on the core support. Each blocks contains vertical water passages, the number and size of these holes selected to provide a specific percentage of void area (e.g. 10%) in a specified region of the block. The water passages between adjacent blocks are aligned creating a plurality of parallel water passages that extends from the bottom to the top of the stack.

According to one aspect of the invention, when the blocks are stacked together, there are seams between each layer of the stack formed by each block. These seams are horizontally aligned with support points between the ends of fuel rods in the core. Any water that "jets" from the seams between the blocks strikes the core at the support points not an intermediate point.

According to the invention, the outer perimeter of all but the uppermost of these blocks has four straight sides 90 degrees apart each side, creating a space between the outer surface of the block and the inner surface of the core barrel. It is through the area between the barrel and the stack that some of the water from the core support flows upward around the outside of the reflector from passages that are located only in the bottom block, between the inside and outside of the stack. The top reflector block, however, contains a flange or rim that controls the space between the stack and the barrel and thus limits the amount of flow around the reflector.

According to the invention, an alignment key extends through the core barrel into a seat on the flange. There are four of these alignment pins which are 90 degrees apart from each other.

According to one aspect of the invention, the alignment pin is welded into the barrel and the seat is a vertical slot in the flange, allowing the stack to be lowered into the barrel. When the stack is resting on the core support, the alignment pins are located in the slot.

According to the invention, the alignment pins have opposed vertical flat surfaces at a distance from opposed walls in the slots. When the stack is in place, that distance is measured and shims, machined to that distance less a calculated thermal expansion, are bolted to the flange, filling the space between the pin and the flange with the pins that are on the barrel passing into the slot.

According to another aspect of the invention, the bottom block which rests on the core support, contains a seat for alignment pins which extend from the seat into a seat in the core support. The alignment pin at the core support contains water flow passages which direct water that is flowing horizontally in the core support through the alignment pin and up through and into holes or passages in the core block.

The present invention provides a reflector with a minimal number of threaded fasteners, particularly in the high flow region of the reactor core. The reflector is a very reliable, easy to assemble and comparatively inexpensive design compared to state of the art reflectors. A compelling feature is that there are a minimum number of horizontal gaps, which are a potential sites for flow jetting which can damage the rods and, because of the invention, any gaps are located at the point where the rods are mechanically supported. Other objects, benefits and features of the invention will be apparent to one skilled in the art from the following discussion.

BRIEF DESCRIPTION OF THE DRAWINGS

FIG. 8 is a section along line 8—8 in FIG. 7.

BEST MODE FOR CARRYING OUT THE INVENTION

Figure 1:
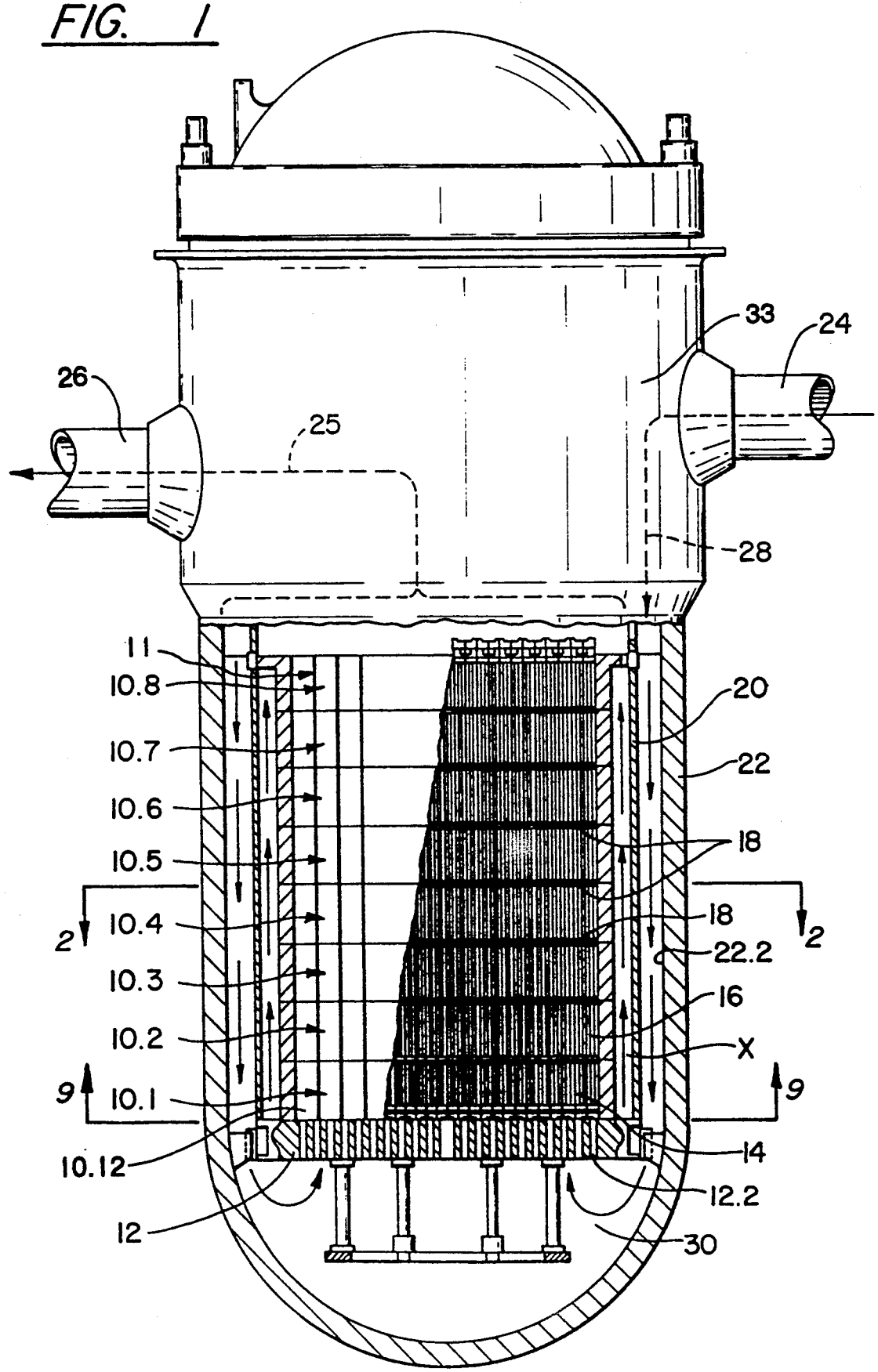
FIG. 1, a sectional view of a reactor vessel, shows a cross-section of a reflector embodying the present invention and the reactor core within the reflector.
Figure 2:
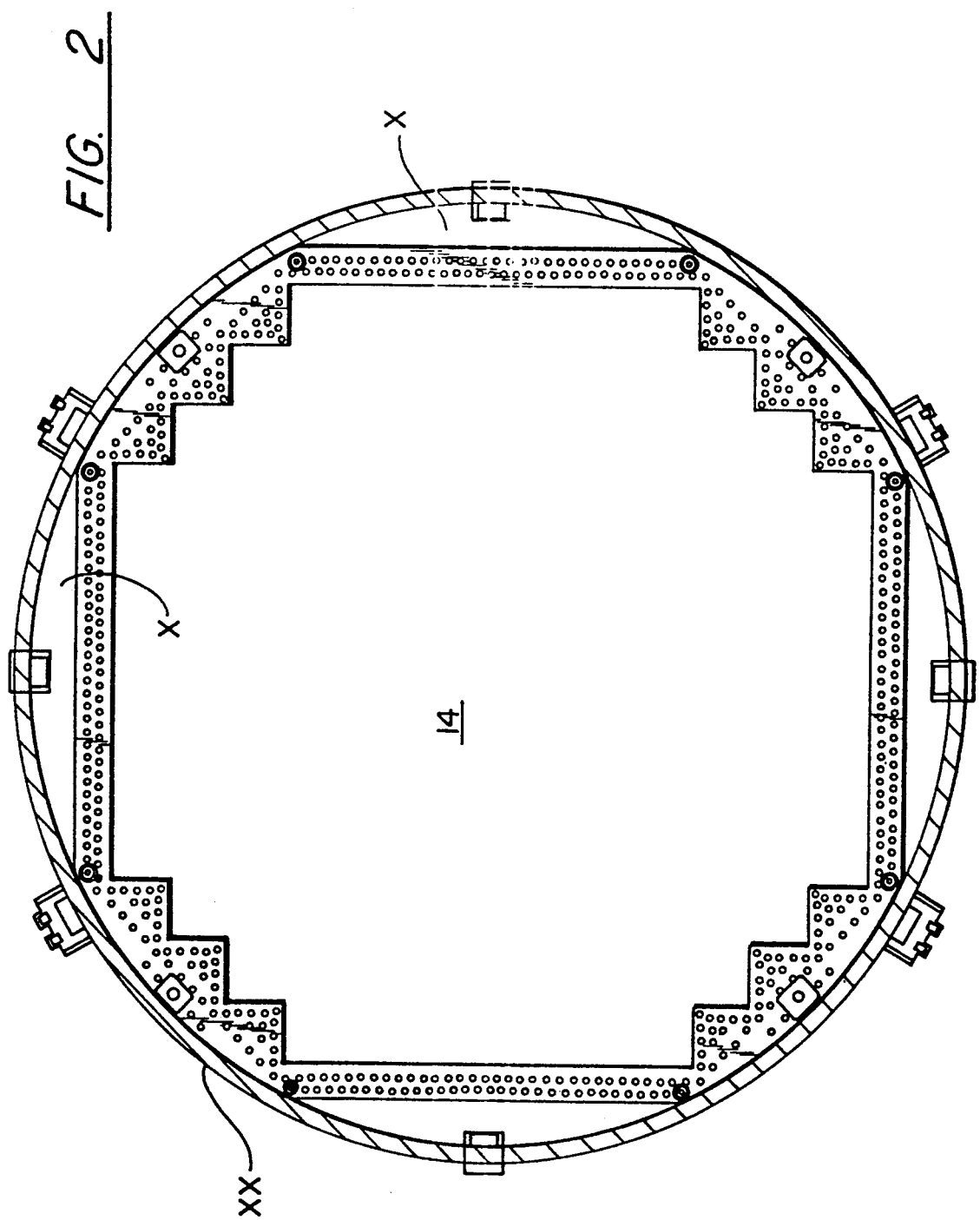
FIG. 2 is a section along line 2—2 in FIG. 1.
Figures 9, 10, 11:
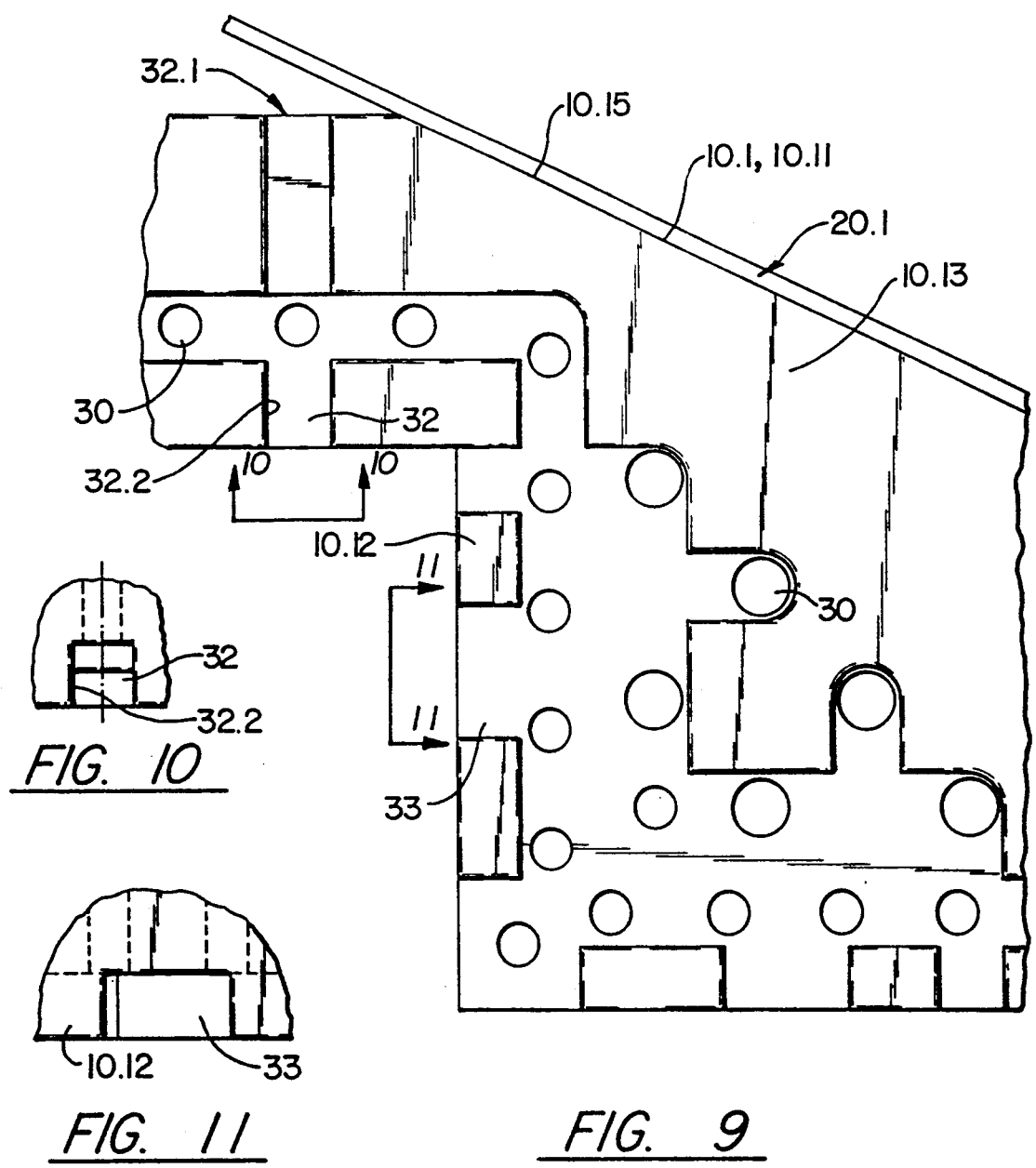
FIG. 9 is a plan view of a portion of the interface between the lowest reflector block and the core support.
FIG. 10 is a section along line 10—10 in FIG. 9.
FIG. 11 is a section along line 11—11 in FIG. 9.
Figure 12:
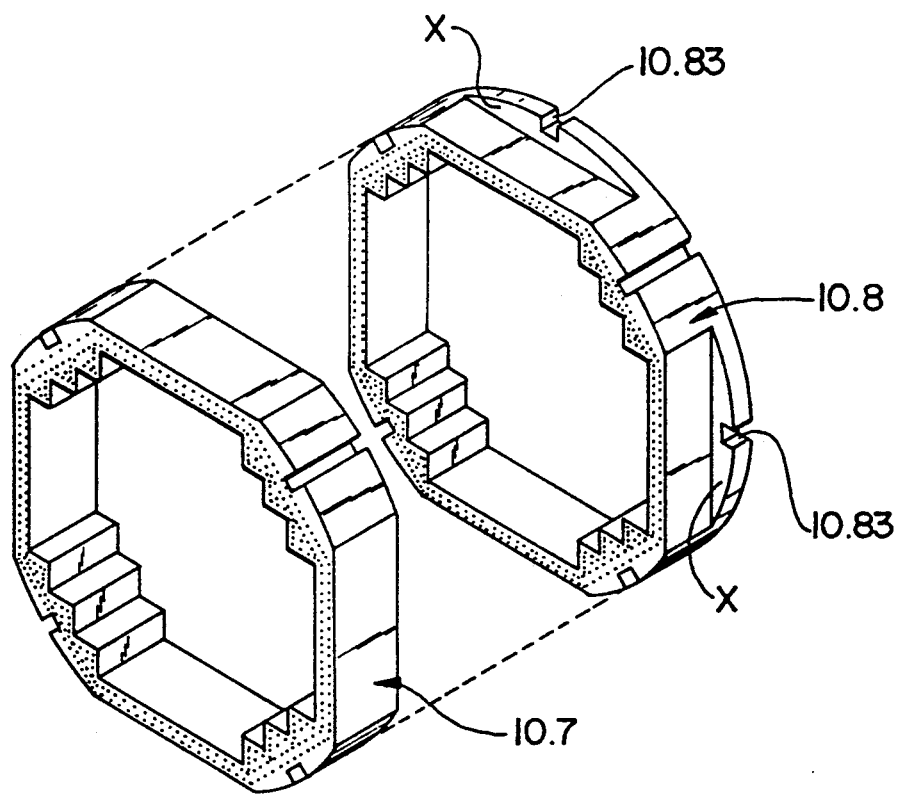
FIG. 12 is a prospective view of the top or uppermost block in a reflector embodying the present invention.

In FIG. 1, which shows a typical reactor vessel, there are eight generally circular reflector blocks 10.1-10.8 (see also FIG. 2 and FIG. 12) resting on a core support 12 that supports a reactor core 14 located within a central portion of the blocks. The blocks, when so stacked, define a stack 11. The reactor core, typical of the type in the state of the art, is made up of a plurality of vertically extending fuel rods 16 suspended between rod supports 18. The rods and core blocks and reflector blocks are housed in a cylindrical core barrel 20, located in a reactor vessel 22, through which water is circulated between inlet 24 and outlet 26. The flow of cooling water follows the path shown by arrow 28, passing between the barrel 20 and the reactor wall 22.2 to a point 30 below the core support where a plurality of holes or passages 12.2 are found that permit water flow up through the reactor core or stack of rods 16 into an upper chamber 33 of the reactor vessel, where the water leaves through the outlet 27. As will be explained in more detail below, the water flow also flows vertically through aligned water passages in the blocks 10.1-10.8 but at this juncture it should be observed that water enters stack at the interface 10.12 at the lowest block 10.1 and the core support 12. In particular, FIG. 9 shows that the lowest block 10.1 contains a plurality of holes 30 that align with holes in the adjacent block 10.2 (see FIG. 1). FIG. 9, which reveals the appearance of the bottom block as seen from the point at which it interfaces with (contacts) core support 12 shows that there is a passage 32, with an inlet 32.1 and outlet 32.2 running through the block from the area occupied by the core 14 to a space 13 between the core barrel 20 and the block 10.1. This space is more easily appreciated n FIG. 2, where it can also be observed that the water that passes from the core area 14 through the space through the passage 32 and into the space flows up along a generally flat portion of the stack. It should be observed that these passages 32 appear at four locations at block 10.1. Water flows up the side of the stack in direction X and four locations 11.1. FIG. 9 also shows that the holes that have different diameters and are dispersed with different densities Y within the block. The determination of the number of holes and their size is calculate to achieve a specific "void density" in particular areas of the block, e.g. 10%.

As FIG. 9 also shows, there is a second passage 33; this slot also allows water to flow between the core base and the lowest block 10.11 where it reaches some of the holes 30. However, these passages 33 do not extend completely through the block but provide a water path to a cavity 32,2 machined in the bottom of the block and also connected to passage 32. The areas 10.12 and 10.13, which define the passages 32 and 33 and the cavity butt directly up against the core support. As a result, the wall 10.15 fits closely to the inner wall 20.1 of the core barrel. The hole pattern may be more easily observed in FIG. 2, where the block butts up virtually against the inner wall 20.1.

To control the flow through the passage 32, the exit 32.1 of the passage smaller area than the inlet 32.2 (see FIG. 10). FIG. 11, a section of the passage 33 shows that it simply leads to the cavity 32.3, providing access to more of the holes 30. For clarity, it is repeated the holes 30 extend linearly through each of the blocks 10.1-10.8 allowing the water to flow through the holes and through the stack, exiting at the top of 10.8. The passages 32 and 33 as noted before are only located on the bottom block 10.11. Also to be observed, the pattern of the passages on the straight sections and the curve sections is symmetrically repeated around each block and that the patterns being mirror images between adjacent blocks.

Figure 3:
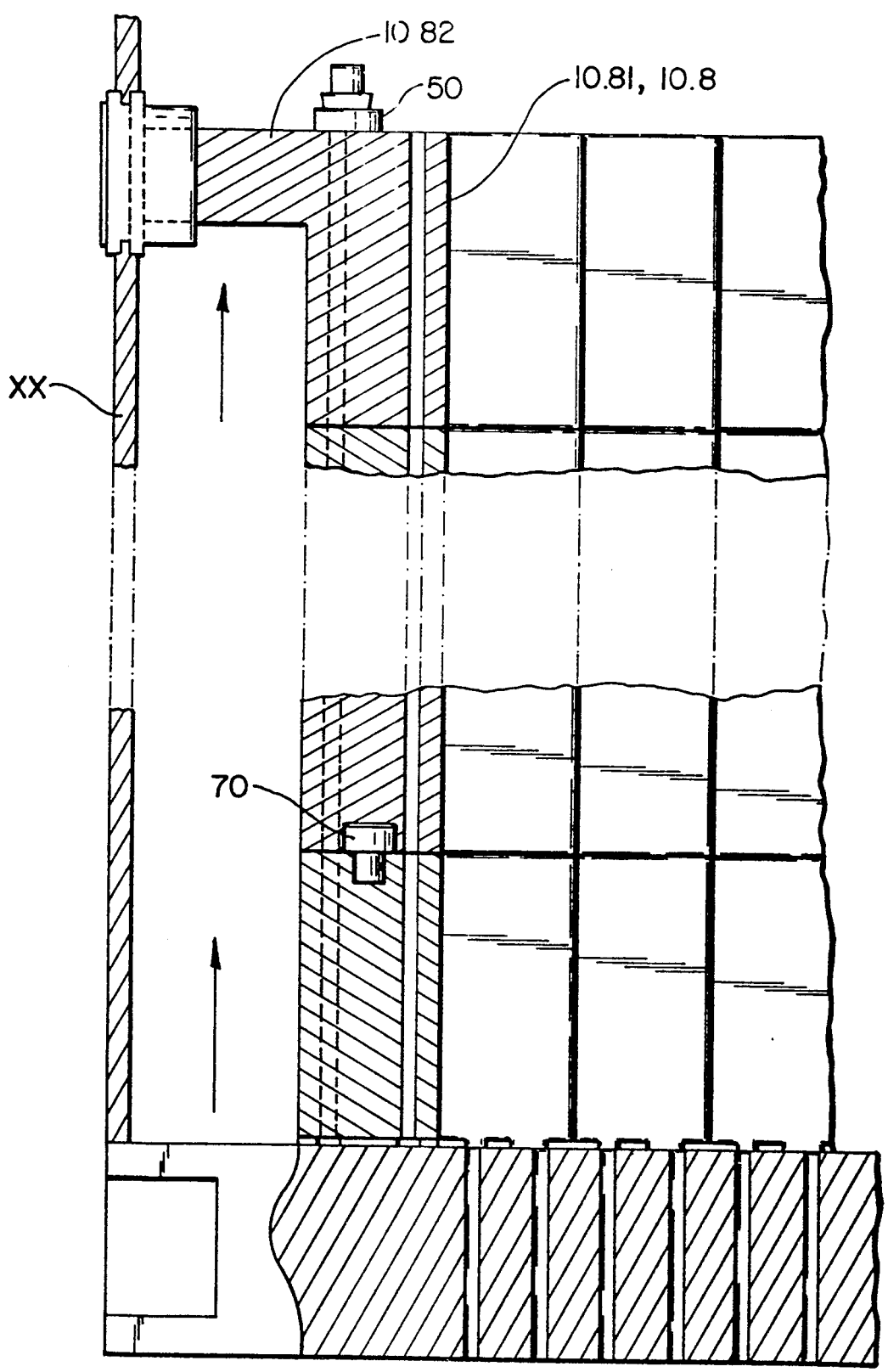
FIG. 3 is a plan view showing a portion of the core barrel and adjacent reflective blocks embodying the present invention.
Figure 4:
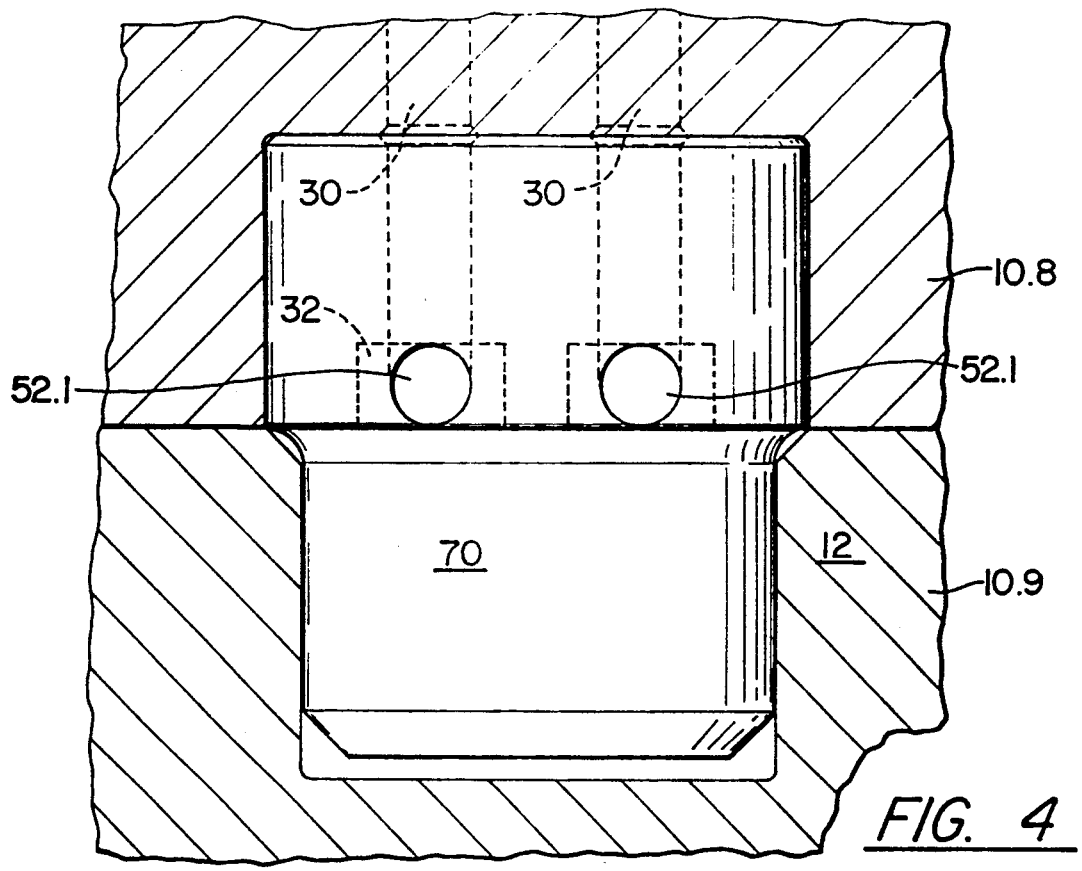
FIG. 4 is an elevation of an alignment pin embodying the present invention that is used between the reactor core support and the lowest reflector block.
Figure 5:
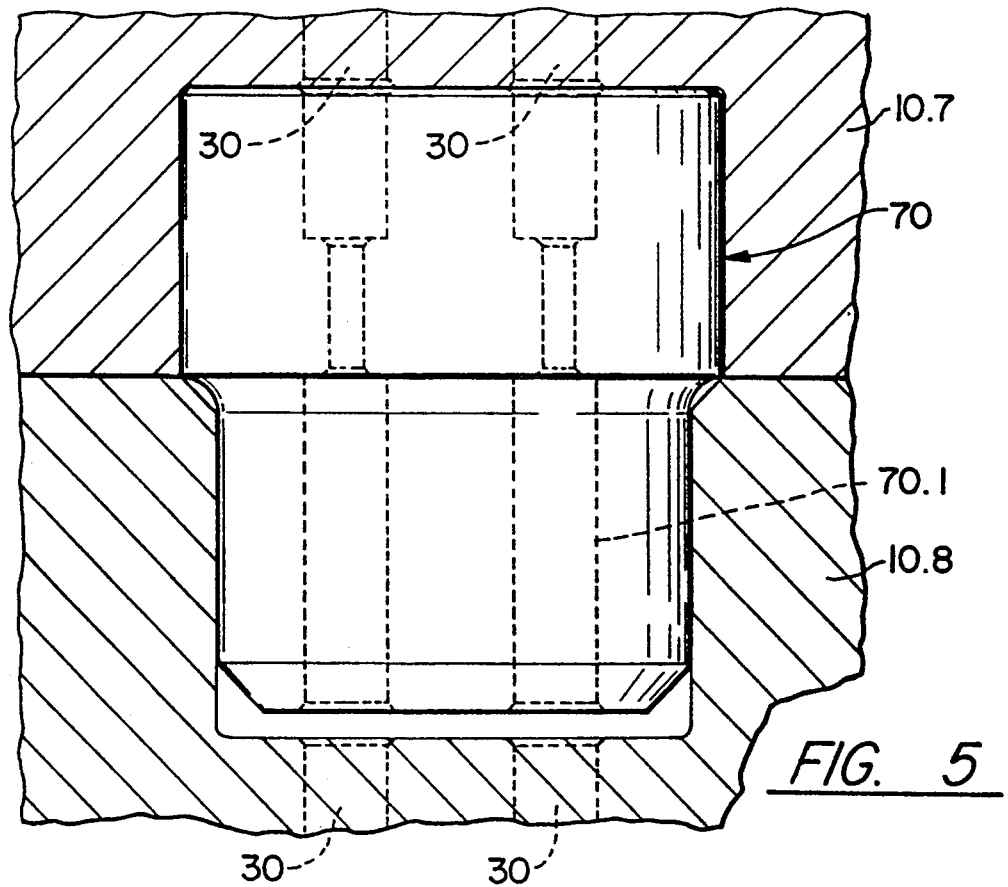
FIG. 5 is an elevation of an alignment pin used between adjacent intermediate reflector blocks according to the present invention.

With reference to FIG. 3 several important features of this embodiment of the invention should be considered. First, the uppermost block 10.81, although having the same hole orientation (flow path XX is), this block is different from the other blocks in that it contains a flange 10.82 with a vertical slot 10.83 for an alignment pin. The entire stack of blocks is held together by tie rods that are located at four points around the stack. During the construction of the reactor, the stack of blocks 10.1-10.8 are tied together with tie rods and lowered into the barrel. The proper location of the stack on the core support is accomplished with an alignment pin 52 which sits within the core support and which as shown in FIG. 4 contains passages 52.1. The inlet of each of these passages is aligned with a corresponding passage 32 or 33 thus allowing water to enter the passage 32 or 33 and flow through the passage 50 to approved point which is aligned with one of the holes which is aligned with two of the holes 30 in the lowest block. As the reflector is lowered into the barrel, it is rotated so that the four slots in the flange 10.82 each are aligned to receive an alignment pin 60 which is welded into the wall of the core barrel. As FIG. 8 shows, this pin extends into the slot 10.83 and has two flat sides 60.1 which are distance X1 from the edges of the block 10.8 When the stack of blocks is inserted in this manner, shims 62 are inserted between the pin and the block and held in place by alignment pins or dowels 64 and bolts 66. When the stack is placed on the core support, the distance X1 for each pin 60 is measured and the actual dimension X1 for each shim 62 is machine to provide a desired tolerance X2 between the shim and pin 60 the purpose being to accommodate a certain level of thermal expansion in the core stack and in the reflector stack as it heats up during reactor operation.

The alignment pins 52 (located at four equiangular positions) are located between the core support 12 and the lowest block 10.8, as mentioned previously. Following a similar design philosophy, alignment pins 70 are located between adjacent blocks, e.g. between blocks 10.8 and 10.7 also at four equiangular points, and these blocks contain passages 70.1 which allow the passage 30 in each of the blocks to be in fluid connection with each other when the two blocks are stacked together.

Figure 6:
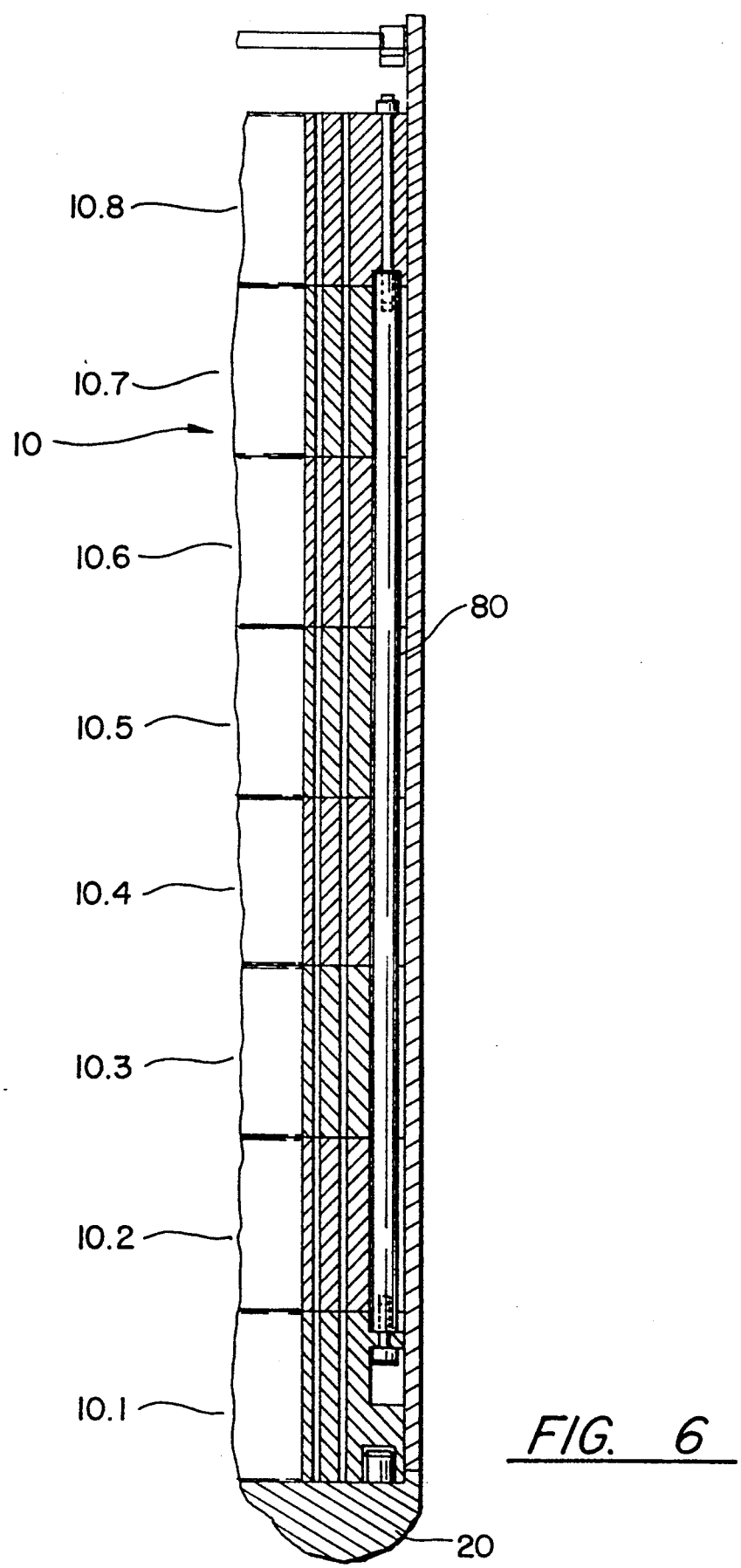
FIG. 6 is a more detailed view of the alignment blocks shown in FIG. 1 and the adjacent core barrel.
Figure 7:
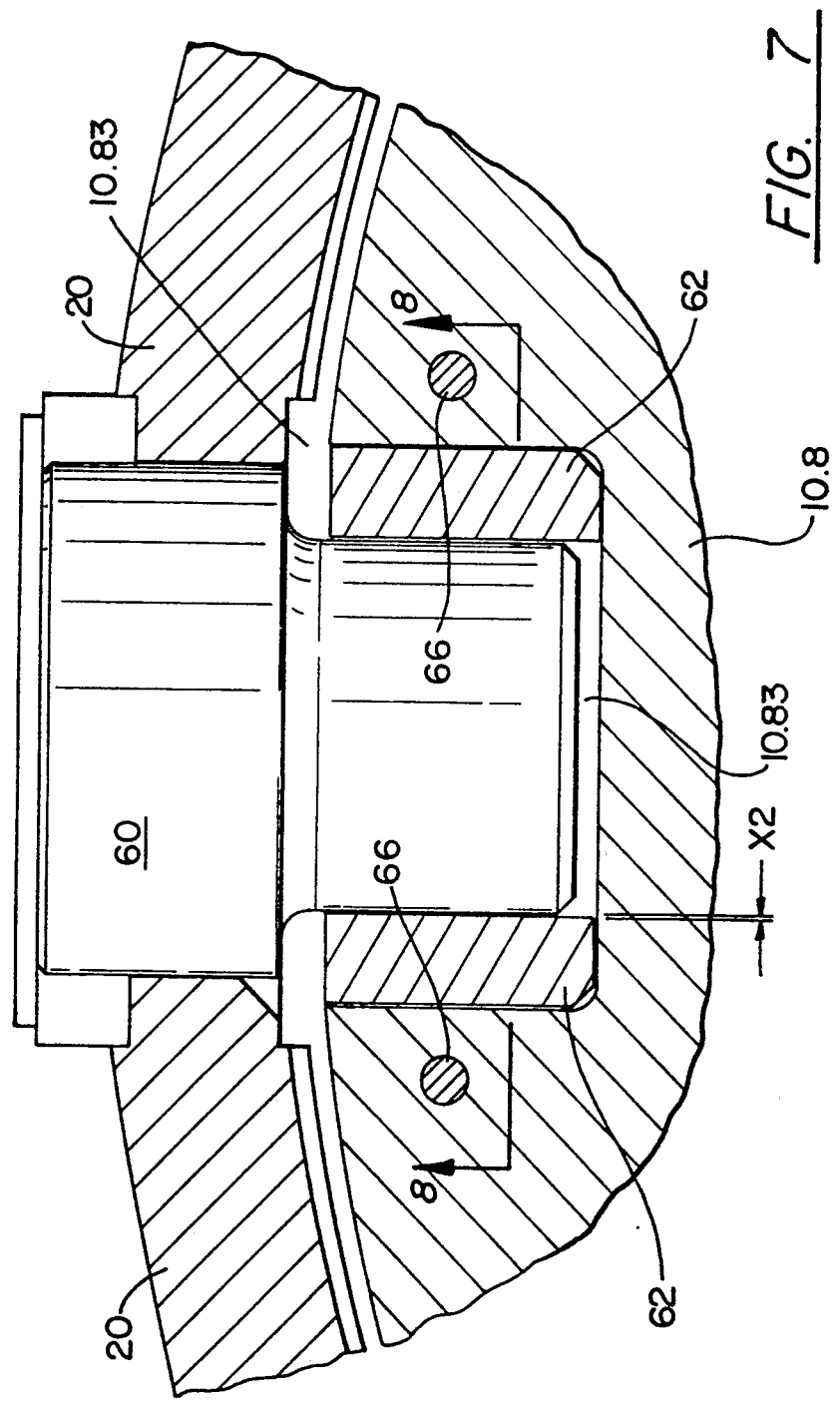
FIG. 7 is a plan view showing a portion of the core barrel and alignment pin and a portion of the top reflector block.

Referring to FIG. 6, a method for aligning the blocks is shown where, once again, the stack 11 is present but at four quadrants there are alignment bar 80 extending from the top block 10.8 to the bottom block 10.1, these being bolted to the blocks. FIG. 6 also shows the alignment pin between the core support 20 and the lowest block. During the assembly of the reactor stack 10, a rectangular slot (for the rectangular alignment bar 80) is machined into the stack when all the blocks are assembled together into the stack. The alignment bars fit tightly into the slots of each reflector block and maintains an acceptable size for the fuel core while limiting the displacement of the reflector blocks during when the stack is installed. This allows for the disassembly of the stack and its reassembly with the same alignment at the reactor construction site.

While the foregoing is a description of the best mode for carrying out the invention, one skilled in the art may modify it in whole or in part without departing from the true scope and spirit of the invention.

We claim:

1. A nuclear reactor comprising a cylindrical barrel, a reactor reflector within the barrel, a reactor core within the reflector including a plurality of axially extending fuel rods and a plurality of axially spaced rod supports located between ends of said fuel rods, and a core support supporting the reflector and the core, characterized by:

the reflector comprising a stack supported on the core support and comprising a plurality of generally annular blocks with the core in the center, each block having water passages extending through the bock in a direction normal to the core support and in alignment with passages in adjacent blocks to provide a plurality of parallel water flow paths through the stack from the core support; and each pair of adjacent blocks meeting on a plane coplanar with one of the rod supports.

2. A nuclear reactor as described in claim 1, further characterized by:

slots in the interface of a first block with the core support, said slots extending through the block to a space between the stack and the barrel that extends to a block at the top of the stack.

3. A nuclear reactor as described in claim 2, further characterized by:

the size and pattern of said water passages in the blocks establishing a selected void percentage.

4. A nuclear reactor as described in claim 3, further characterized by:

a block at the top of the stack, said block having a flange that extends from the block to a wall of the barrel to substantially close said space except for a selected clearance between the flange and said wall, to allow flow to an area above the flange at a selected rate.

5. A nuclear reactor as described in claim 4, further characterized by:

an alignment pin fastened to the barrel and extending into a slot in said flange; and shims attached to the flange and located in diametrically opposed spaces between the pin and the flange, said pins providing a selected clearance in said spaces.

6. A nuclear reactor as described in claim 5, further characterized in that:

said slot extends through the flange in a direction parallel to said wall of the barrel and defines two spaced apart parallel surfaces in the flange; and said alignment pin has two diametrically opposed parallel surfaces, each spaced apart and parallel to one of said surfaces in the flange.

7. A nuclear reactor according claim 6, further characterized by:

a first plurality of alignment slots that extend in a direction normal to the core support, said slots being spaced at equal angles from each other around a circular center of the block;

a first plurality of rods, each extending through aligned alignment slots of adjacent blocks and anchored to blocks at the top and bottom of the stack.

8. A nuclear reactor comprising a cylindrical barrel, a reactor reflector within the barrel, a reactor core within the reflector including a plurality of axially extending fuel rods and a plurality of axially spaced rod supports located between the ends of said fuel rods, and a core support supporting the reflector and the core, characterized by:

the reflector comprising a stack comprising a plurality of generally annular blocks with the core in the center, each block having water passages extending through the block in a direction normal to the core support and in alignment with passages in adjacent blocks to provide a plurality of parallel water flow paths through the stack from the core support;

each pair of adjacent blocks meeting on a plane coplanar with one of the rod supports;

slots in the interface of a first block with the core support, said slots extending through the block to a space between the stack and the barrel that extends to a block at the top of the stack;

the size and pattern of said water passages in the blocks establishing a selected void percentage;

a block at the top of the stack, said block having a flange that extends from the bock to a wall of the barrel to substantially close said space except for a selected clearance between the flange and said wall, to allow flow to an area above the flange at a selected rate;

an alignment pin fastened to the barrel and extending into a flange slot in said flange;

shims attached to the flange and located in diametrically opposed spaces between the pin and the flange, said pins providing a selected clearance in said spaces;

said flange slot extending through the flange parallel to said wall of the barrel and defines two spaced apart parallel surfaces in the flange;

said alignment pin having two diametrically opposed parallel surfaces, each spaced apart and parallel to one of said surfaces in the flange;

a first plurality of alignment slots that extend in a direction normal to the core support, said alignment slots being spaced at equal angles from each other around a circular center of the block; and a first plurality of rods, each extending through aligned alignment slots of adjacent blocks and anchored to blocks at the top and bottom of the stack.

9. A nuclear reactor reflector for insertion in a cylindrical reactor barrel resting on a core support, characterized by:

a plurality of reflector blocks stacked to form a reflector stack, each block having a hollow interior to receive a reactor core and along a block perimeter two pairs of flat sides with parallel surfaces diametrically opposite each other relative to a geometric center of curvature for the block and the stack, said surfaces being 90 degrees apart and connected by arcuate surfaces on a radius of curvature about said center of curvature for the block and the stack, said radius of curvature extending from said center of curvature substantially to an inner wall surface of the barrel, said blocks containing water passages extending through the block in the longitudinal direction of the barrel and connecting with like passages on adjacent blocks;

a block at the bottom of the stack having a interface surface contacting the core support, said surface comprising a first water passage that extends, parallel with a top surface of the core support, from said interior through each of said flat sides to provide a fluid path between the interior and a space between each flat side and the wall of the barrel, said passage communicating with a plurality of said water passages in the bottom block and having a first cross sectional area at the interior and a smaller cross sectional area near said flat surface, second passages on said interface surface that extends from said interior in parallel with said top surface to establish fluid communication with said first passage and said water passages in the block, said second passages extending into the block only to a depth sufficient to establish fluid communication between said water passages and the interior;

the distribution of said water passages in each block providing a selected percentage to void space in each block, said space selected to achieve a calculated level of cooling for the reflector from water flowing through said water passages from said first and second passages;

a top block on the stack having flanges extending to the interior wall of the barrel at radius of curvature abut said center to establish a selected flow in flow passages between said flat surfaces and the barrel;

an alignment pin extending through the barrel wall into a vertical slot in each flange;

a pair of shims, for each alignment pin, inserted in a space between the alignment pin and the flange; and a plurality of spaced apart pins in opposed seats in the core support and said interface surface and containing right angle water passages with an outlet aligned with said water passages in said block at the block and an inlet aligned with said first water passage.

* * * * *